United States Patent Office 3,108,141
Patented Oct. 22, 1963

3,108,141
PRODUCTION OF ALIPHATIC BROMIDES
Edward James Gasson and David James Hadley, Epsom Downs, England, assignors to The Distillers Company Limited, Edinburgh, Scotland, a British company
No Drawing. Filed Mar. 19, 1959, Ser. No. 800,364
Claims priority, application Great Britain Apr. 9, 1958
10 Claims. (Cl. 260—663)

The present invention relates to the production of aliphatic bromides, and in particular to the production of aliphatic bromides in which the bromine atom is attached to the terminal carbon atom.

The production of aliphatic bromides by the reaction of certain terminal olefines with an excess of liquid hydrogen bromide in the presence of molecular oxygen as catalyst has already been described, although molecular oxygen has been reported not to promote the reaction of butene-1 with liquid hydrogen bromide. From the point of view of large scale operation such processes would not be practicable owing to the large amounts of hydrogen bromide needed and the slow rate of production of the bromide product.

According to the present invention the process for the production of aliphatic bromides in which the bromine atom is attached to a terminal carbon atom comprises continuously passing hydrogen bromide and molecular oxygen into a solution of a terminal olefine or its halo-substituted product in the aliphatic bromide product.

The discovery on which the process of the present invention is based is that by operating in this way a very high rate of production of aliphatic bromide can be achieved.

The terminal olefine starting materials used in the process of the present invention have the formula $$CH_2=CR_1R_2$$

in which $R_1$ is hydrogen, alkyl or halo-alkyl, and $R_2$ is alkyl or halo-alkyl. As examples of these may be mentioned propylene, butene-1, isobutene, octene-1, 2-ethyl-hexene-1, octadecene-1, 3-chlorbutene-1 and allyl bromide. It is particularly preferred to use butene-1. The term terminal olefine as used in this specification does not include ethylene.

The proportion of olefine and hydrogen bromide used can vary over moderately wide limits depending on the relative solubilities of the olefine and the hydrogen bromide in the reaction medium, and on the pressure at which the reaction is carried out. Advantageously the reaction is carried out under such conditions that the molar proportion of hydrogen bromide in solution is not substantially in excess of the olefine and it is preferred to use a molar proportion of olefine to hydrogen bromide of at least 1:1. In a particularly preferred embodiment the olefine is present in a slight molar excess over the hydrogen bromide, for instance up to 1.2 moles of olefine per mole of hydrogen bromide.

The volume of molecular oxygen passed through the reaction mixture may be varied between wide limits, for instance between 0.01–1.0 mole of oxygen per mole of hydrogen bromide fed. A suitable source of oxygen is air.

The reaction may be carried out at any suitable temperature, for instance between −20° and 70° C. and preferably between 0° and 40° C.

The reaction according to the process of the present invention is carried out in the liquid phase, by continuously passing gaseous hydrogen bromide and oxygen into a solution of the olefine in the aliphatic bromide product which acts as the reaction solvent. It is desirable that the oxygen and hydrogen bromide are mixed in as close proximity as is practicable to the reactor, or in the reactor itself, to minimize the formation of secondary bromide. It is preferred to feed in the olefine above the point of entry of the hydrogen bromide. If desired, additional solvents or diluents may be present. Advantageously gaseous hydrogen bromide, the olefine starting material and oxygen are fed continuously into the liquid reaction mixture comprising a solution of the olefine in the aliphatic bromide product. In a preferred embodiment the reaction is carried out continuously in a vessel fitted with an overflow device. Hydrogen bromide, oxygen, and the olefine starting material are fed separately to the base of the reaction vessel which contains a solution of the olefine in the aliphatic bromide product, and the aliphatic bromide product containing small amounts of dissolved olefine overflows from the top of the vessel. During the progress of the reaction, water is produced. If the contents of the reaction vessel are not stirred, this water will settle to the bottom and on accumulation will displace the aliphatic bromide. Therefore in the absence of stirring it is desirable to remove this water, either continuously or periodically, from the bottom of the reaction vessel.

If it is necessary to purify the aliphatic bromide this can be done, for instance by fractional distillation.

The normal aliphatic bromides produced by the process of the present invention are valuable intermediates in the production of normal alcohols.

The process of the present invention is further illustrated by the following examples.

Example 1

Mixed butenes (containing 87% butene-1 and 13% butene-2) and gaseous hydrogen bromide containing 3% by volume of oxygen were fed separately through diffusers into the lower end of a vertical cylindrical reactor containing n-butyl bromide and maintained at 20° C. by an external water jacket. The rates of feed were: butenes, 370 l. per hour, hydrogen bromide 350 l. per hour and oxygen, 10.5 l. per hour, per l. of reactor volume. The butyl bromides produced overflowed continuously from the reactor into a receiver. The hydrogen bromide reacted almost completely, and the excess butene and oxygen could be recycled. Analysis of the butyl bromide mixture produced showed that the yield of n-butyl bromide on butene-1 consumed was 94%. The remainder of the product consisted of sec-butyl bromide and a small quantity of other by-products including dibromobutane (2.4% conversion) and water. The water was periodically drained from the base of the reactor. The production rate of n-butyl bromide amounted to 2 kg. per hour, per litre of reactor volume.

Example 2

A second run was carried out under the conditions of Example 1, except that a 10% excess of hydrogen bromide over butene was maintained. The reaction was less rapid in this instance, neither of the reactants being completely consumed, but the yield of n-butyl bromide, based on butene-1 consumed was high (94%).

Example 3

Gaseous hydrogen bromide containing 5% by volume of air, and butene-1 (87% purity) were fed through gas diffusers into a reactor containing n-butyl bromide at 70° C. The molar ratio of butene to hydrogen bromide fed was 1.07:1. Loss of butyl bromides in the effluent gas was prevented by refrigeration of the latter to 0° C. The product, collected during an operating period of 2 hours, contained 81% n-butyl bromide and 15.8% sec-butyl bromide. The yield of n-butyl bromide, based on butene-1 fed, was 95%.

Example 4

Hydrogen bromide and oxygen were together introduced through a gas diffuser into n-butyl bromide, at the rates respectively of 472 and 13.3 l. per hour per l. of reactor volume. A mixture containing 93.7% butene-1 and 5.6% butene-2 was introduced through a separate tube into the butyl bromide at a rate of 472 l. per hour per l. The reaction mixture was maintained at an average temperature of 20° C. by external cooling. Over 97% of the butenes and hydrogen bromide were converted to butyl bromides which were continuously removed from the reactor through an overflow tube. The product was of a high degree of purity and contained by analysis, 92.5% n-butyl bromide and 7.0% sec-butyl bromide. The yield of n-butyl bromide on butene-1 was 98.7%. The water concurrently produced was removed intermittently from the base of the reactor.

Example 5

In a further hydrobromination of butene-1 carried out as in Example 4 except that the reaction temperature was maintained at −15° C., the product contained 93.2% n-butyl bromide and 6.5% sec-butyl bromide. The butenes and hydrogen bromide fed to the reactor were completely consumed. The yield of n-butyl bromide from butene-1 was 99.5%.

Example 6

A mixture containing 80% octene-1 and 20% octene-2 was fed with hydrogen bromide and oxygen into a stirred reactor containing n-octyl bromide. The feed rates were 23.4, 23.4 and 0.7 moles per hour per l. respectively, and the temperature of the reaction mixture was kept at 20° C. by external cooling.

The yield of octyl bromides was 100%, based on octene fed to the reactor, and the product contained 80% n-octyl bromide. Thus the yield of n-octyl bromide on octene-1 was 100%.

Example 7

Octadecene-1, hydrogen bromide and oxygen were introduced in the same molar rates as in the previous example, into a stirred reactor containing octadecyl-1-bromide at 25° C.

The product solidified on cooling to a white wax-like solid which melted at 18° C. and which contained (by infra-red analysis) about 95% n-octadecyl bromide and 5% 2-bromo-octadecane. The yield of the mixed bromides on octadecene fed was quantitative.

Example 8

Allyl bromide (23.4 moles per hour per l.) hydrogen bromide (23.4 moles per hour per l.) and oxygen (0.7 mole per hour per l.) were introduced into 1:3 dibromopropane in a stirred reactor at 20° C. The product contained 94.2% of 1:3 dibromo-propane.

Example 9

2-ethyl hexene-1, hydrogen bromide and oxygen were fed at 23.4, 23.4 and 0.7 moles per hour per l. respectively into 2-ethylhexyl-1-bromide at 20° C. Reaction of the hydrogen bromide and olefin was complete. The yield of 2-ethylhexyl-1-bromide was 65%; the remainder was converted to a mixture of isomeric bromides and to dibromides.

Example 10

A mixture containing 3-chlorbutene-1 (80%) and crotyl chloride (20%) was introduced at 20 moles per hour per l. with hydrogen bromide (20 moles per hour per l.) and oxygen (0.6 mole per hour per l.) into chlorobromobutane at 20° C. Complete reaction of the olefine and hydrogen bromide was achieved and the product contained a mixture of chlorobromo butanes (96.5%) and chloro dibromobutanes (3.5%).

The yield of 1 bromo-3-chlorobutane based on 3-chlorbutene-1 fed was about 80%.

We claim:

1. The process for the production of aliphatic bromides in which the bromine atom is attached to a terminal carbon atom which comprises continuously passing gaseous hydrogen bromide and molecular oxygen into a solution in the aliphatic bromide product of a compound selected from the group consisting of terminal olefines and their halo-substituted derivatives.

2. The process according to claim 1 in which the olefine is butene-1.

3. The process according to claim 1 in which the olefine is 2-ethyl-hexene-1.

4. The process according to claim 1 in which the molar proportion of olefine to hydrogen bromide is at least 1:1.

5. The process according to claim 1 in which the molar proportion of olefine to hydrogen bromide is about 1.2:1.

6. The process according to claim 1 in which between 0.01 and 1.0 mole of oxygen are fed to the reactor for every mole of hydrogen bromide.

7. The process according to claim 1 wherein the reaction is carried out at a temperature between 0° C. and 40° C.

8. The process according to claim 1 wherein hydrogen bromide, molecular oxygen and the olefine starting material are continuously introduced into a reaction zone containing a solution of the olefine in the aliphatic bromide product, and the aliphatic bromide product and the separate aqueous phase formed are separately removed from the reaction zone.

9. The process according to claim 1 wherein hydrogen bromide, molecular oxygen and the olefine starting material are continuously introduced into a reaction zone containing a solution of the olefine in aliphatic bromide product, and the aliphatic bromide product and the separate aqueous phase formed are removed in admixture from the reaction zone.

10. The process according to claim 1 wherein the aliphatic bromide product is subjected to fractional distillation to recover the aliphatic bromide.

References Cited in the file of this patent

UNITED STATES PATENTS 2,058,466    Kharasch _____ Oct. 27, 1936

OTHER REFERENCES

Migrdichian: Organic Synthesis, vol. II, Reinhold Publishing Co. (1957), pp. 865–7 relied on.